D. R. REED.
APPLE CORER AND SLICER.
No. 80,010.                                Patented July 14, 1868.
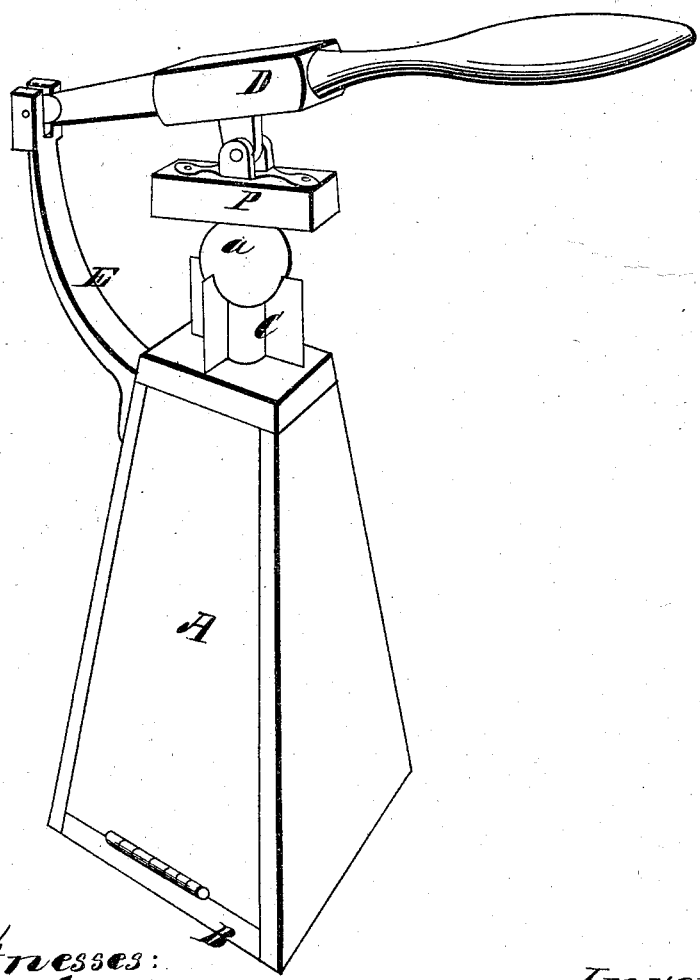
Witnesses:
S. D. Frazier
C. D. Cluff
Inventor:
David R. Reed

United States Patent Office.

DAVID R. REED, OF TEKONSHA, MICHIGAN.

Letters Patent No. 80,010, dated July 14, 1868.

---

IMPROVED APPLE-CORER AND SLICER.

---

*The Schedule referred to in these Letters Patent and making part of the same.*

---

TO ALL WHOM IT MAY CONCERN:

Be it known that I, DAVID R. REED, of Tekonsha, in the county of Calhoun, and State of Michigan, have invented a new and useful Improvement in Machines for Coring and Quartering Apples, or other suitable fruit; and I do hereby declare that the following is a full, clear, and exact description of the construction and operation of the same, reference being had to the annexed drawing, making a part of this specification, in which a view of the machine is given in perspective.

My invention relates mainly to the mode of connecting the operating-devices, and separating the cores from the quarters; and the better to enable others skilled in this particular branch to construct the said invention, I will proceed to describe it.

It consists simply of a square tapering box, of convenient capacity, for the reception of the cores, substantially as exhibited at A.

I fasten the top of this box to the sides, and hinge the bottom, B, securing it, when shut, with a hook and staple. The hinged bottom is designed for convenience in emptying the cores from the box when full, but it is not absolutely indispensable that the bottom should be hinged at all, for a simple piece of board with ledges, or fitted loosely in with a rabbet, will answer all practical uses, or the bottom may be nailed fast like the top, and an opening made in one side to be covered with a door, which may be opened or removed for emptying the cores.

The usual core-tube, with side-cutting flanges, is shown at C. I connect this to the top of the box aforesaid, by an elongation of the tube, which is inserted snugly into a hole bored in the centre of the top of the box, which top should be of just sufficient area as will insure the falling off therefrom of the quarters as they are cut.

To force the apples down on the cutters, I use a hand-lever, D, one end of which is jointed to a cast-metal arm, E, screwed to the box in the relative position, as seen, and in order to preserve a more uniform horizontal bearing upon the apple, I find it useful to joint to the lever a presser, P, which, however, may be dispensed with, and the apples be forced down by a flatted surface on the lever.

The operation is as follows: The machine is placed in a pan or tub designed to receive the quarters, and the pared apples a are successively placed on the cutters C, and cored and quartered by depressing the hand-lever D, the quarters falling, as they are cut, through into the pan, and the cores as they are cut and forced through the tube, falling into the box A, which, when full, may be emptied, in the manner hereinbefore described.

I am aware that machines erected on tables, have been used, which core and quarter apples by pressers acting against flanged tubes, and therefore do not claim that as my invention; but I am not aware of any in which the operating-devices are fastened to a box which receives the cores, and keeps them separated from the cut quarters falling into the pan, within which the box is placed, as in my invention, the effect of which is to make the machine more simple, compact, convenient, and inexpensive for general use.

What I claim as my invention, and desire to secure by Letters Patent, is as follows:

I claim the arrangement and combination of the flange coring-tube C, presser P, hand-lever D, arm E, with the receiving-box A, substantially in the manner and for the purpose specified.

DAVID R. REED.

Witnesses:
ROBERT MOOR,
S. D. FRAZIER.